US012465928B2

(12) United States Patent
Stout et al.

(10) Patent No.: US 12,465,928 B2
(45) Date of Patent: Nov. 11, 2025

(54) CENTRIFUGE INCLUDING ROTOR WITH RECESSES

(71) Applicant: THE DRUCKER COMPANY, LLC, Port Matilda, PA (US)

(72) Inventors: Craig Stout, Port Matilda, PA (US); Christopher L. Ivory, State College, PA (US); Thomas Mallison, State College, PA (US)

(73) Assignee: THE DRUCKER COMPANY, LLC, Port Matilda, PA (US)

( * ) Notice: Subject to any disclaimer, the term of this patent is extended or adjusted under 35 U.S.C. 154(b) by 1003 days.

(21) Appl. No.: 17/643,962

(22) Filed: Dec. 13, 2021

(65) Prior Publication Data

US 2022/0241799 A1 Aug. 4, 2022

Related U.S. Application Data

(60) Provisional application No. 63/144,179, filed on Feb. 1, 2021.

(51) Int. Cl.
*B04B 7/06* (2006.01)
*B04B 7/02* (2006.01)
*B04B 9/08* (2006.01)

(52) U.S. Cl.
CPC .................. *B04B 7/06* (2013.01); *B04B 9/08* (2013.01); *B04B 2007/025* (2013.01)

(58) Field of Classification Search
CPC ....... B04B 7/06; B04B 9/08; B04B 2007/025; B04B 5/0414; B04B 7/02; B04B 2009/085; B04B 5/04; F16D 65/22
USPC .................................................... 494/1, 7, 12
See application file for complete search history.

(56) References Cited

U.S. PATENT DOCUMENTS 3,720,368 A * 3/1973 Allen .................... B04B 5/0414 494/60
5,772,572 A * 6/1998 Koch ........................ B04B 7/02 494/60
6,152,868 A * 11/2000 Walters ................. B04B 5/0414 494/19
9,440,244 B2 * 9/2016 Schmidt .................. B04B 7/085

FOREIGN PATENT DOCUMENTS

GB 1564930 A * 4/1980 ............... B04B 7/06
WO WO-2005074662 A2 * 8/2005 ............. B04B 15/02

* cited by examiner

*Primary Examiner* — Duane Smith
*Assistant Examiner* — Shuyi S. Liu
(74) *Attorney, Agent, or Firm* — McNees Wallace & Nurick LLC

(57) ABSTRACT

A centrifuge including a rotor having at least one recess, at least one protrusion or a combination of the at least one recess or the at least one protrusion defining a concave arrangement, each of the at least one recess, the at least one protrusion or the combination of the at least one recess or the at least one protrusion adapted to receive a corresponding specimen container.

14 Claims, 6 Drawing Sheets

CENTRIFUGE INCLUDING ROTOR WITH RECESSES

FIELD OF THE INVENTION

The present invention is directed to centrifuges.

BACKGROUND OF THE INVENTION

Centrifuges are used in many applications, including medical applications for processing blood, urine, or other specimens to permit subsequent diagnostic testing or other analysis. These centrifuges are typically used in blood collection centers, hospital laboratories, physician's offices, or other laboratories staffed by trained operators. If medical patients could collect blood specimens themselves in the comfort of their own home, these same patients would also require a centrifuge at home to process the specimens, thereby avoiding travel to a facility otherwise required for specimen collection and processing involving a centrifuge. Unfortunately, centrifuges are typically both large and expensive, and moreover, due to the complex rotor assemblies and high rotational speeds involved, operation of the centrifuge by an untrained operator could present safety risks. Centrifuges in prior art utilize rotor, buckets, rotor lids, and other accessories that require an operator to be trained and competent in the practice of loading, and operating a centrifuge. There is a need in the art for a centrifuge that can be used by a layman and does not suffer from these shortcomings, e.g., a centrifuge design allowing the operator to lay a tube in the rotor without need for any rotor or bucket assembly, selection of inserts, or installing a rotor lid, where the centrifuge cannot operate if done incorrectly.

SUMMARY OF THE INVENTION

One embodiment is directed to a centrifuge including a rotor having at least one recess, at least one protrusion or a combination of the at least one recess or the at least one protrusion defining a concave arrangement that, during centrifugation, creates g-forces that serve to retain the specimen in the rotor without need for additional mechanical means; although secondary mechanical means could also be used. Each of the at least one recess, the at least one protrusion or the combination of the at least one recess or the at least one protrusion is adapted to receive one or more types of corresponding specimen containers.

Another embodiment is directed to a centrifuge including a one or more piece rotor having one or more recesses defining a concave arrangement, each recess adapted to receive one or more types of corresponding specimen containers. The centrifuge further includes a centrifuge lid having one or more features preventing the lid from being fully closed if specimen containers are not inserted into the rotor recess correctly. The same feature in the lid serves to act as a secondary mechanical means to retain the specimen containers in the rotor during centrifugation.

Another embodiment is directed to a centrifuge including a rotor having one or more recesses defining a concave arrangement, each recess adapted to receive a corresponding specimen container. The centrifuge further includes a lid having at least one feature acting as a mechanical brake; thereby preventing rotation of the rotor in response to the lid being in an open position.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

This invention is directed to a centrifuge that is compact and inexpensive. In one embodiment, the centrifuge may be approximately the size of a cell phone, possibly smaller, and similarly operating at low voltage/power requirements, such as within the parameters of current cell phone chargers (e.g., 9V or 8 W). In one embodiment, the cost of the centrifuge may be sufficiently low to practically classify the centrifuge as a "throw away" device, permitting a single or one-time usage. This invention further includes features to permit persons otherwise capable of providing the specimens in specimen containers for processing in the centrifuge themselves, but unfamiliar with operating centrifuges ("lay persons"), to safety operate the centrifuge.

The term "specimen" and "specimen container" and the like may be used interchangeably.

Figure 1:
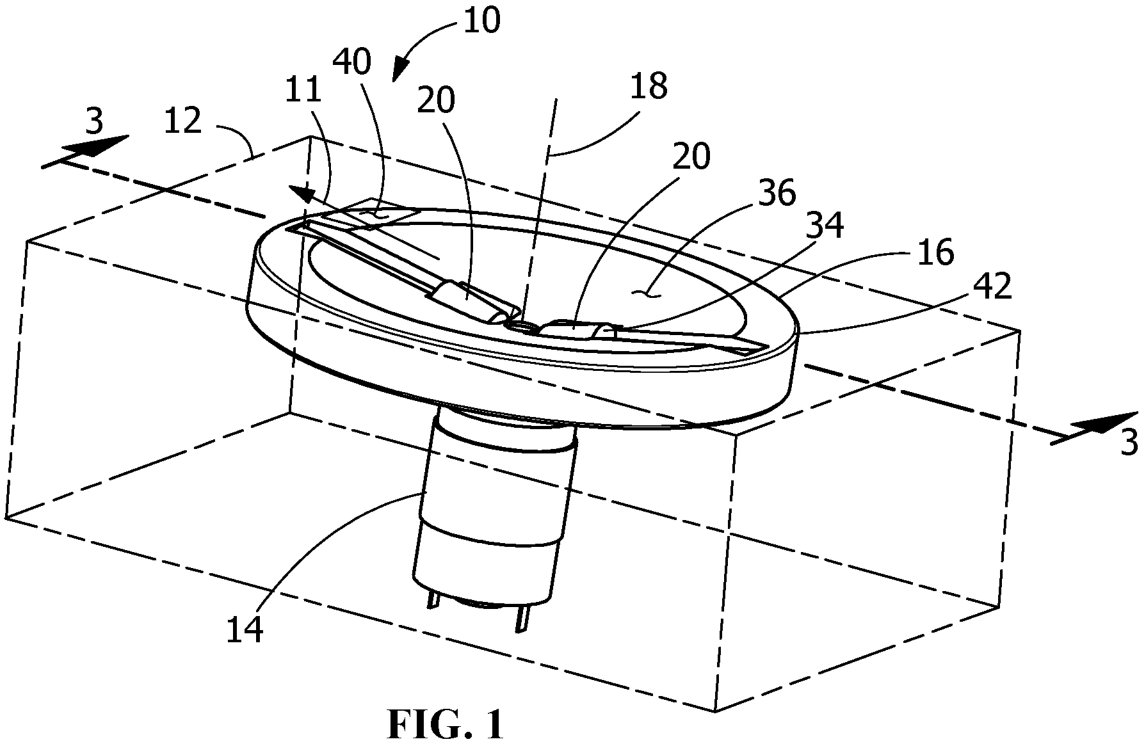
FIG. 1 is an upper perspective view of an exemplary centrifuge.

FIG. 1 shows a centrifuge 10 having an enclosure 12 for receiving a motor 14 that rotatably carries a rotor 16 and typically one pair of opposed specimen containers 20 about an axis 18. In one embodiment, centrifuge 10 may rotatably carry more than one pair of specimen containers 20. Motor 14 is adapted to rotate rotor 16 about axis 18 at rotational speeds for generating a relative centrifugal force (RCF) 11, expressed in units of gravity (times gravity or ×g), sufficient for the application, such as separating specimen constituents in specimen containers 20. In one embodiment, the RCF 11 may approach or exceed 5,000 g.

Figure 2:
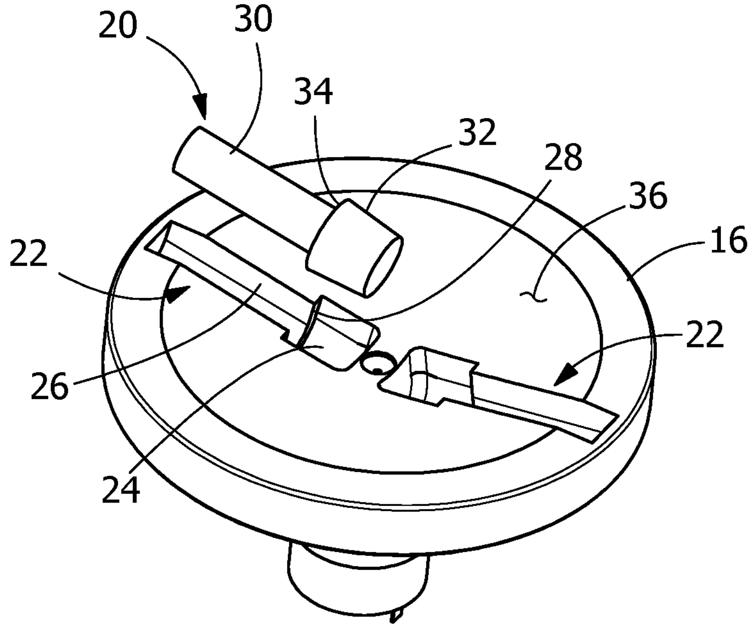
FIG. 2 is a partial upper perspective view of a specimen container prior to placement in the centrifuge of FIG. 1.
Figure 3:
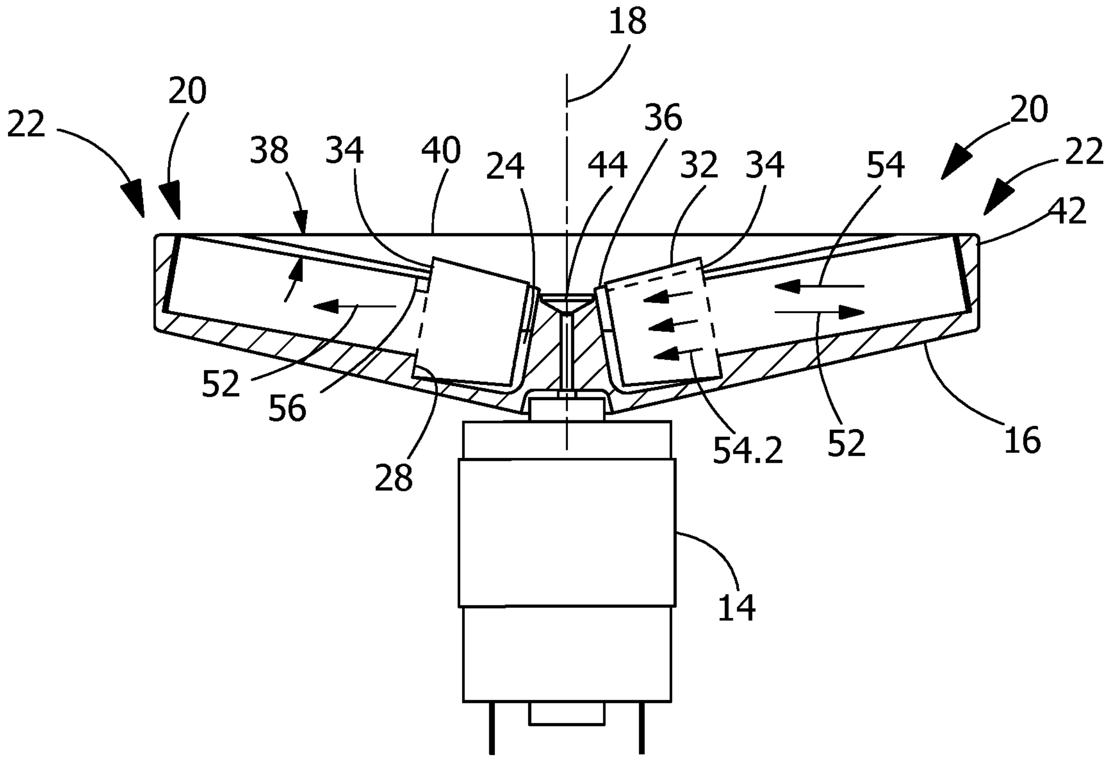
FIG. 3 is a cross section of the centrifuge taken along line 3-3 of FIG. 1.

As shown in FIG. 2, rotor 16 includes a pair of opposed recesses 22, each recess 22 having differently sized or arranged recess portions 24, 26, with a shoulder 28 positioned between recess portions 24, 26. That is, recess portion 24 is larger than recess portion 26. As further shown, each specimen container 20 includes container portions 30, 32 separated by a shoulder 34, which container 20 being generally conformally received and secured in recess 22. More specifically, as shown, container portion 32, which is larger than container portion 30, corresponds to and is adapted to be generally conformally received in recess portion 24 of recess 22, and container portion 30, which is smaller than container portion 32, corresponds to and is adapted to be generally conformally received in recess portion 26 of recess 22. As a result, each specimen container 20 is adapted for a one-way fit in a corresponding recess 22, preventing the specimen containers from being incorrectly installed in the rotor. As shown in FIGS. 1 and 3, a portion of container portion 32 extends outwardly from a surface 34 of rotor 16, permitting specimen container 20 to be more easily removed from its corresponding recess 22.

As shown in the figures, and more specifically in FIG. 3, which is a cross section taken along line 3-3 of FIG. 1, surface 36 of rotor 16 and a plane 40 coincident with an outer edge 42 of rotor 16 subtends a non-zero angle 38 therebetween. Stated another way, proceeding from outer edge 42 toward a center 44 of rotor 16, surface 36 is inwardly directed into the body of rotor 16, defining a concave arrangement.

Figure 11:
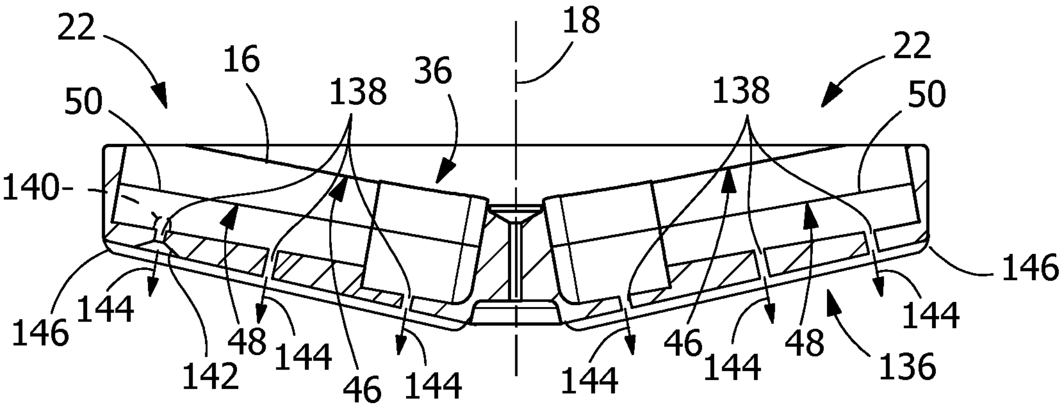
FIG. 11 is a cross section of the centrifuge without specimen containers taken along line 3-3 of FIG. 1.

For purposes herein, the terms "concave," "concave arrangement" and the like are intended to mean that an interior angle between corresponding features is greater than 180 degrees. For example, as shown in FIG. 11, which is a cross section of the centrifuge without specimen containers taken along line 3-3 of FIG. 1, interior angle 46 subtends an angle that is greater than 180 degrees between opposed portions of surface 16, with rotor rotational axis 18 bisecting interior angle 46. Similarly, interior angle 48 subtends an angle that is greater than 180 degrees between axes 50 of opposed recesses 22, with rotor rotational axis 18 bisecting interior angle 48.

For purposes herein, the term "interior angle" and the like is intended to mean an angle inside a shape between two joined sides. For example, as shown in FIG. 11, interior angle 46 is subtended by opposed portions of surface 16. Similarly, interior angle 48 subtends an angle that is greater than 180 degrees between axes 50 of opposed recesses 22.

It is to be understood that in other embodiments, the interior angles 46 and 48 may not be the same, so long as the interior angles are greater than 180 degrees.

As shown in FIG. 3, which is a cross section of the centrifuge taken along line 3-3 of FIG. 1, a novel safety feature provided by the concave arrangement of rotor 16 features is now discussed. During operation of the centrifuge, in response to motor 14 rotating rotor 16 and specimen containers 20 received in corresponding recesses 22 formed in rotor 16 about axis 18, considerable forces are generated. More specifically, each specimen container 20 is subjected to a centrifugal force 52 outwardly directed perpendicular to rotational axis 18. Opposed centripetal forces 54 distributed along shoulder 28 of recess 22 are applied to the corresponding shoulder 34 of specimen container 20 in contact with shoulder 28 to maintain specimen container 20 in position during operation of the centrifuge as a result of the novel geometry of shoulder 28 of recess 22 relative to rotational axis 18.

Figure 10:
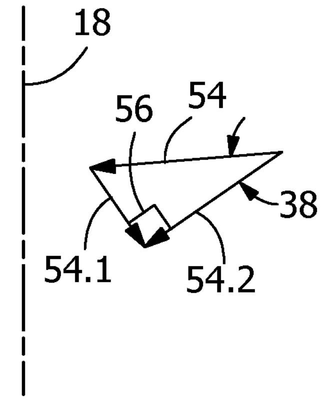
FIG. 10 depicts centripetal forces generated by the exemplary rotor to a specimen container of FIG. 3.

That is, as shown in FIG. 3, shoulder 28 is perpendicular 56 (element 56 "square" represents a 90 degree angle) to surface 36 of rotor 16, which surface 36 subtending an angle 38 with plane 40 that is coincident to edge 42 of rotor 16, which plane 40 is perpendicular to rotational axis 18 of rotor 18. As a result of this novel geometry, as shown in FIG. 10, the centripetal force 54 may be expressed as a combination of distributed centripetal force components 54.1 and distributed centripetal force components 54.2, the magnitudes of the forces being calculable utilizing the Pythagoras equation [1]:

$$C=\sqrt{A^2+B^2} \quad [1]$$

C=centripetal force 54
A=centripetal force component 54.1
B=centripetal force component 54.2

Centripetal force component 54.1 acts to secure specimen container 20 in position in its corresponding recess 22 during operation of the centrifuge. As a result, as appreciated by those having ordinary skill in the art, as the magnitude of centrifugal force 54 increases, the magnitudes of mutually perpendicular centripetal force components 54.1, 54.2 similarly increase, meaning that in response to increasing the rotational speed of the rotor, centripetal force component 54.1 securing and retaining specimen container 20 in its corresponding recess 22 also increases to prevent inadvertent removal of specimen container 20 from recess 22 of rotor 16. Furthermore, as a result of this novel construction, a lid is not required to secure specimen container 20 in position during operation of the centrifuge. Furthermore, as a result of the one-piece concave arrangement of rotor, assembly of the centrifuge is simplified, the number of components is reduced, and the cost associated with manufacture and assembly is likewise reduced. In one embodiment, rotor may be composed of more than one piece.

Figure 4:
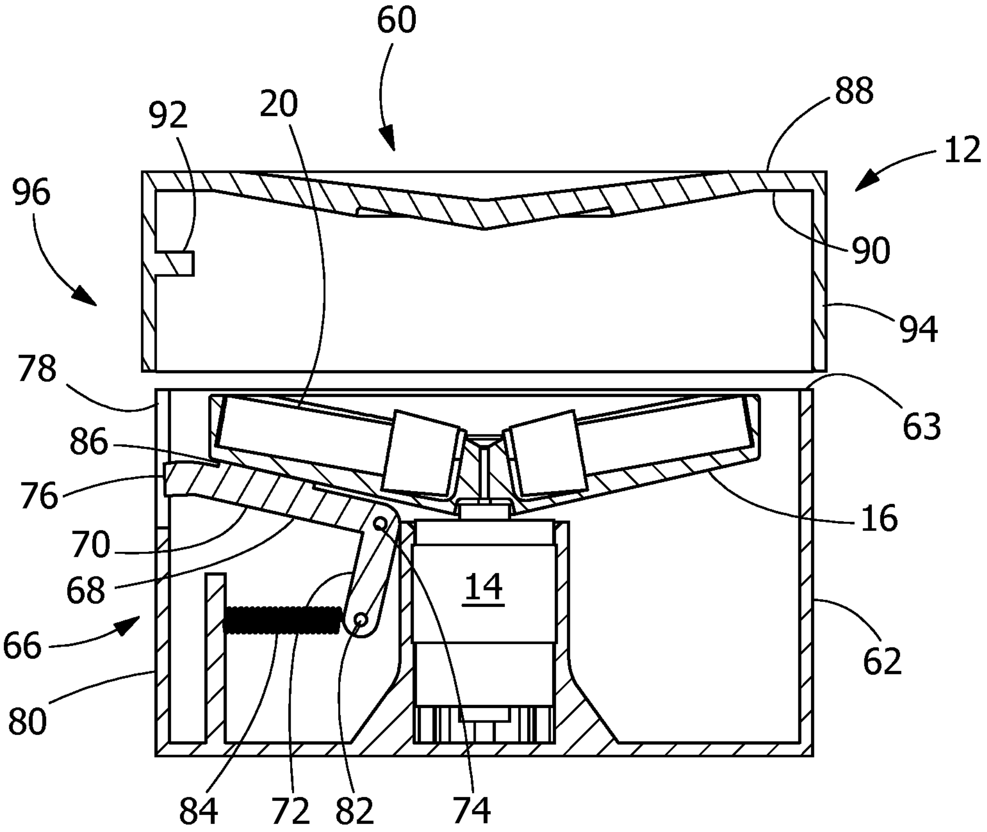
FIG. 4 is a cross section of an exemplary centrifuge prior to installation of a lid, permitting application of the brake to retard or prevent rotor rotation.
Figure 5:
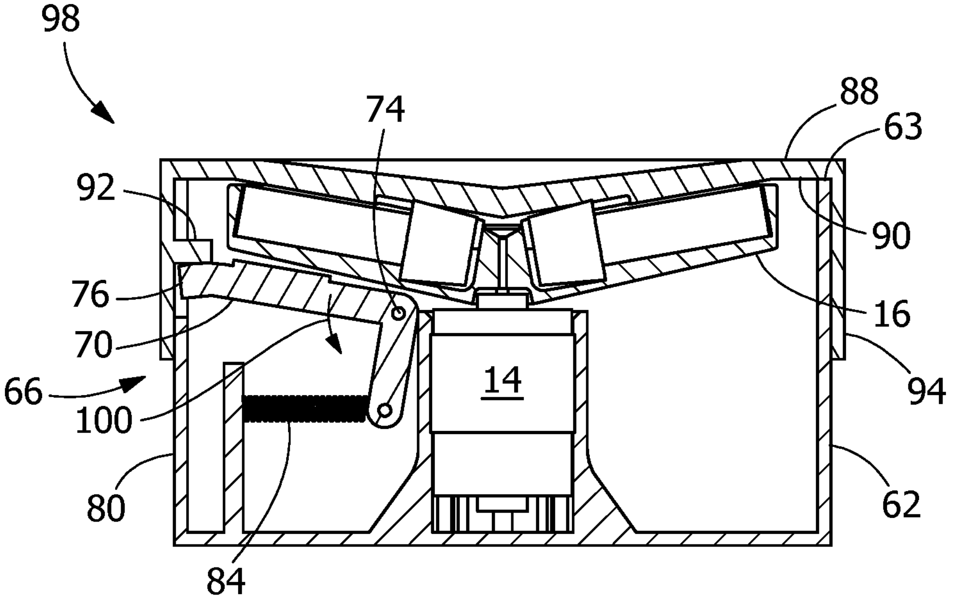
FIG. 5 is a cross section of the centrifuge of FIG. 4 with the lid installed for urging the brake out of frictional contact with the rotor, thereby permitting rotor rotation.

FIGS. 4 and 5, which are cross sections taken along line 3-3 of FIG. 1, show an exemplary safety feature of centrifuge 60. Centrifuge 60 includes an enclosure 12 comprising a housing 62 having a lip or edge 63 and securing motor 14 and rotor 16 as previously discussed, and a pivotable linkage 66 comprising a L-shaped member 68 having legs 70, 72 pivoting about pivotable connection 74. An end 76 of leg 70 extends into or is proximate to a slot 78 formed in sidewall 80 of housing 62. An end 82 of leg 72 opposite pivotable connection 74 is connected to a spring 84. A brake 86 faces a corresponding surface of rotor 16. A lid 88 of enclosure 12 includes an inner surface 90 and a protrusion 92 extending inwardly from inner surface 90 of a sidewall 94 of lid 88. FIG. 4 shows a non-closed or an open position 96 of lid 88 relative to housing 62, in which brake 86 of pivotable linkage 66 is urged into frictional contact with rotor 16 by spring 84, thereby preventing rotor 16 from rotating if the rotor 16 is not already rotating when lid 88 is brought into open position 96 from a closed position 98 (FIG. 5), or retarding rotor 16 from rotating in the case rotor 16 is currently rotating when lid 88 is brought into open position 96 from closed position 98 (FIG. 5). Stated another way, in non-closed or open position 96, protrusion 92 does not engage pivotable linkage 66 to interrupt frictional contact with rotor 16 by spring 84. In one example, if specimen container 20 were incorrectly installed, specimen container 20 would prevent lid 88 from closing.

Conversely, as shown in FIG. 5, lid 88 is in closed position 98, in which sidewall 94 of lid 88 is slid over sidewall 80 of housing 62 until lip or edge 63 of housing 62 abuts inner surface 90 of lid 88. Simultaneously, as lid 88 is slid over housing 62, protrusion 92 of lid 88 slidably engages slot 78 (FIG. 4) of housing 62, and further engages end 76 of pivotable linkage 66, overcoming the retention force of spring 84 and urging pivotable linkage 66 to rotate or pivot about pivotable connection 74 in a rotational direction 100 and similarly urging brake 86 out of frictional contact with rotor 16, thereby permitting rotor 16 to otherwise rotate.

Figure 6:
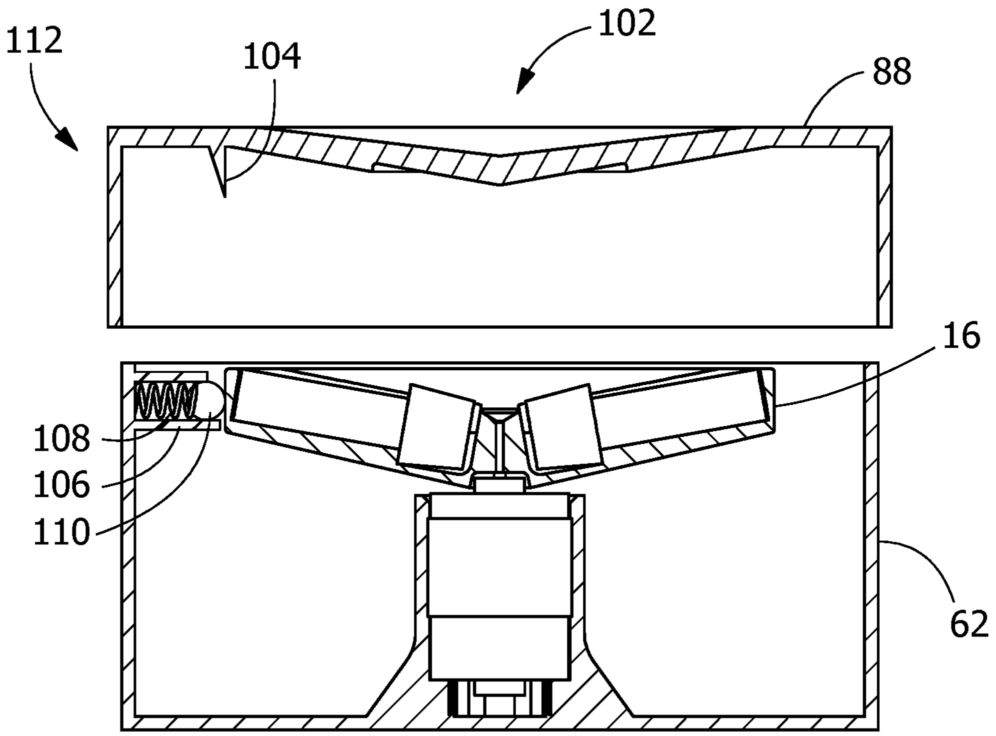
FIG. 6 is a cross section of an exemplary centrifuge prior to installation of a lid, permitting application of the brake to retard or prevent rotor rotation.
Figure 7:
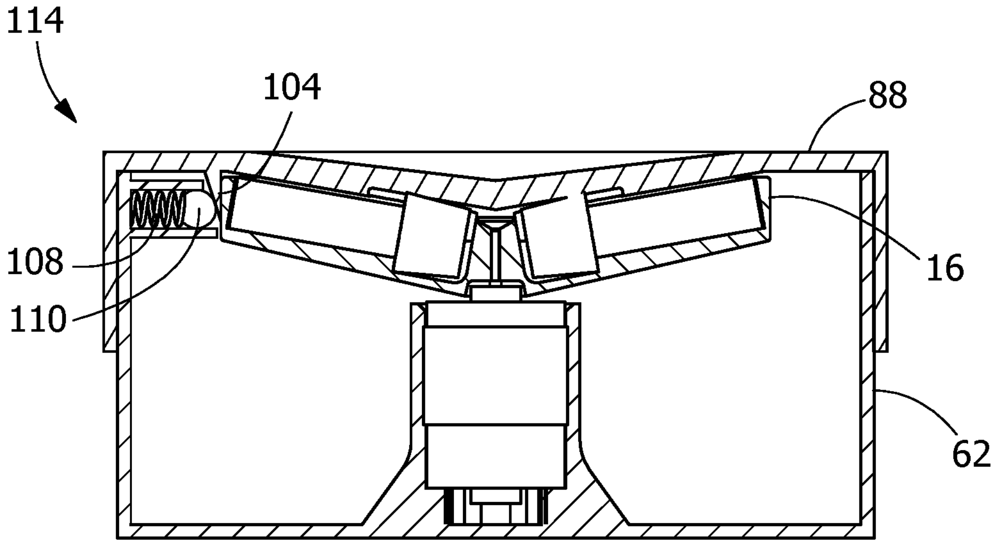
FIG. 7 is a cross section of the centrifuge of FIG. 6 with the lid installed for urging the brake out of frictional contact with the rotor, thereby permitting rotor rotation.

FIGS. 6 and 7, which are cross sections taken along line 3-3 of FIG. 1, show an exemplary safety feature of centrifuge 102, which is similar to centrifuge 80, except as discussed. For example, instead of a pivoting linkage 66 (FIG. 4), housing 62 of centrifuge 102 includes a sleeve 106 containing a spring 108 urging a brake 110 such as a spherical ball into frictional engagement in an open position 112 (FIG. 6), thereby preventing rotor 16 from rotating if the rotor 16 is not already rotating when lid 88 is brought into open position 112 (FIG. 6), from a closed position 114 (FIG. 7), or retarding rotor 16 from rotating in the case rotor 16 is currently rotating when lid 88 is brought into open position 112 (FIG. 6) from closed position 114 (FIG. 7).

Conversely, as shown in FIG. 7, lid 88 is in closed position 114, in which protrusion 104 is inserted between brake 110 and rotor 16, urging brake 110 out of frictional contact between rotor 16 and brake 110, permitting rotor 16 to rotate.

Figure 8:
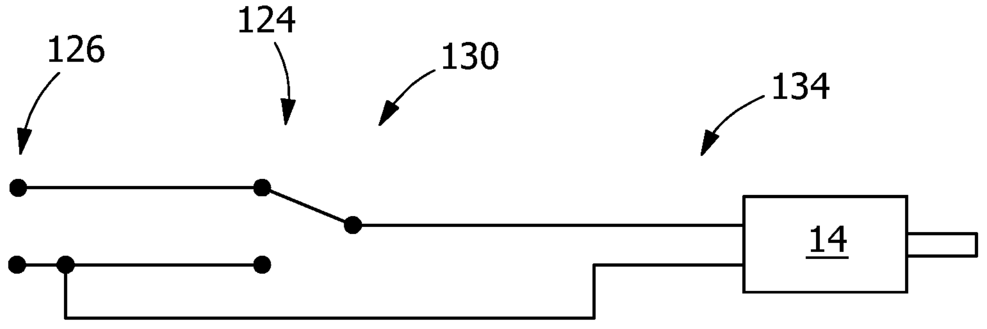
FIG. 8 schematically depicts an operating condition of an exemplary centrifuge.
Figure 9:
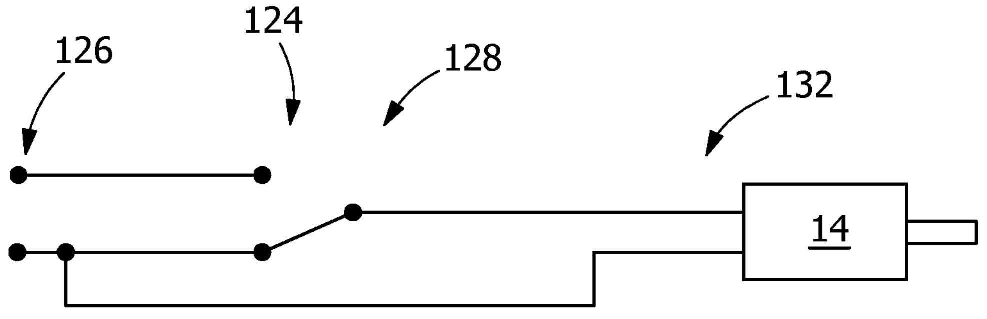
FIG. 9 schematically depicts a braking, non-operating condition of an exemplary centrifuge.

FIGS. 8 and 9 schematically show a further safety feature incorporated into an electrical circuit of the centrifuge and involving a two-position switch 124, such as associated with the lid 88 (FIG. 4). More specifically, as shown in FIG. 8, a closed electrical circuit 134 is achieved between positive and negative leads of a power source 126, such as a battery or plug-in power source with motor 14, and switch 124 in a closed position 130, such as being achieved when the lid is in a closed position relative to the housing, as previously discussed, permitting operation of the motor 14. Conversely, as shown in FIG. 9, an open electrical circuit 132 is achieved, interrupting the electrical connection between positive and negative leads (e.g., isolating the negative lead from the rest of the circuit) of power source 126, switch 124 being in an open position 128, such as being achieved when the lid is in an open position relative to the housing, as previously discussed, preventing operation of the motor 14. This arrangement also beneficially helps bring the rotor to a stop more quickly, acting as a braking safety feature since an operator does not have access to the rotor chamber while the rotor is rotating.

FIG. 11, which is a cross section without specimen containers taken along line 3-3 of FIG. 1, shows an exemplary feature of centrifuge 10 that at least partially helps retain specimen containers 20 (FIG. 1) in corresponding recesses in the centrifuge. More specifically, as further shown in FIG. 11, rotor 16 includes a surface 36 and an opposed second surface 136. Surface 36 has at least one recess 22 adapted to receive a corresponding specimen container 20 (FIG. 1). In one embodiment, rotor 16 may include two or more recesses 22. As shown, each recess 22 has at least one aperture 138 formed through rotor 16, that is, extending through surface 36 of recess 22 and then further extending through surface 136 of rotor 16. Stated another way, each aperture 138 is in fluid communication between surface 36 and surface 136. By virtue of this fluid communication between the opposed rotor surfaces 36, 136, during operation of centrifuge 10, a retention force 144 is generated that at least partially assists or aids with retaining specimen containers 20 (FIG. 1) in corresponding recesses 22.

More specifically, in combination with each aperture 138 being in fluid communication between surface 36 and surface 136, during operation of centrifuge 10, during which operation rotor 16 is rotating about axis 18, surface 136, which includes surface features 146, such as protrusions positioned in close proximity to apertures 138 generates retention forces 144 as a result of Bernoulli's principle, which states that for an inviscid flow, an increase in the speed of the fluid occurs simultaneously with a decrease in pressure or a decrease in the fluid's potential energy. In other words, if surface 136 of rotor 16 is configured relative to the opposed surface 36 rotor so that the speed of the airflow over surface 136 is less than the speed of the airflow over surface 36, a pressure of the air surrounding surface 136 is less than a pressure of the air surrounding the opposite surface 36, creating a reduced pressure in aperture 138 relative to surface 36, resulting in the generation of retention forces 144 (in the form of a suction pressure force) for retaining specimen containers 20 (FIG. 1) in their corresponding recesses 22.

As a result of retention forces 144, it may be possible to reduce the magnitudes of interior angles 46, 48. That is, reduce the concavity or reduce the magnitude of supplementary angles, or stated another way, to reduce these angles toward 180 degrees, and/or to reduce the size of recess 22.

In one embodiment, the cross section of at least one recess is uniform. In one embodiment, the cross section of at least a portion of at least one recess is different than the cross section of another portion of the same recess, or a different recess.

In one embodiment, an interface between the surface 36 of recess 22 and at least one aperture 138 includes a discontinuous region 140, such as a local protrusion or recess along the interface. In one embodiment, an interface between the surface 136 and at least one aperture 138 includes a discontinuous region 142, such as a local protrusion or recess along the interface. These recessed regions 140, 142 may enhance the effect of Bernoulli's principle (i.e., affecting the magnitudes of retention forces 144).

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A centrifuge, comprising:

a rotor having an opposed pair of recesses defining a concave arrangement, each recess adapted to receive a corresponding specimen container, wherein each recess includes a first portion and a second portion, the second portion being larger than the first portion, wherein the container includes a container portion for containing a specimen and a cap portion, wherein the first portion of the recess generally conformally receives and secures the container portion of the container, and wherein the second portion of the recess generally conformally receives and secures the cap portion of the container;

a switch movable between a closed position and an open position, wherein in response to the switch being in the closed position, a motor circuit is closed, and wherein in response to the switch being in the open position, the motor circuit is open; and a lid having a feature preventing rotation of the rotor when the rotor is not currently rotating or retarding rotation of the rotor when the rotor is currently rotating, in response to the lid not being in a closed position, wherein the feature is a protrusion extending inwardly from an inner surface of the lid; and wherein in response to the lid being in the closed position, the protrusion is positioned between a brake and the rotor, urging the brake away from frictional contact with the rotor, and permitting the rotor to rotate.

2. The centrifuge of claim 1, wherein the protrusion is adapted to extend through a slot formed in a housing;

wherein in response to the lid not being in the closed position, the protrusion does not engage a pivotable linkage having a brake in a frictional contact with the rotor;

wherein in response to the lid being in the closed position, the protrusion urges the brake away from the frictional contact with the rotor, permitting the rotor to rotate.

3. The centrifuge of claim 1, wherein the rotor is one-piece.

4. The centrifuge of claim 1 further comprising a switch movable between a closed position and an open position, wherein in response to the switch being in the closed position, a motor circuit is closed, and wherein in response to the switch being in the open position, the motor circuit is open.

5. A centrifuge, comprising:

a one-piece rotor having an opposed pair of recesses defining a concave arrangement, each recess adapted to receive a corresponding specimen container; and a lid having at least one feature preventing rotation of the rotor when the rotor is not currently rotating or retarding rotation of the rotor when the rotor is currently rotating, in response to the lid not being in a closed position, wherein each recess includes a first portion and a second portion, the second portion having a different size than the first portion, with a shoulder positioned between the first portion and the second portion, wherein the at least one feature is a protrusion extending inwardly from an inner surface of the lid, and wherein in response to the lid being in the closed position, the protrusion is positioned between a brake and the rotor, urging the brake away from a frictional contact with the rotor, and permitting the rotor to rotate.

6. The centrifuge of claim 5, wherein the protrusion is adapted to extend through a slot formed in a housing; wherein in response to the lid not being in the closed position, the protrusion does not engage a pivotable linkage having a brake in a frictional contact with the rotor; wherein in response to the lid being in the closed position, the protrusion urges the brake away from the frictional contact with the rotor, permitting the rotor to rotate.

7. The centrifuge of claim 5 further comprises a switch movable between an on position and an off position, wherein in response to the switch being in the on position, a motor circuit is closed, and wherein in response to the switch being in the off position, the motor circuit is open.

8. A centrifuge, comprising:

a rotor having an opposed pair of recesses or protrusions or combination of recesses or protrusions defining a concave arrangement, each pair of the recesses or protrusions or combination of recesses or protrusions adapted to receive a corresponding specimen container, wherein each recess or protrusion or combination includes a first portion and a second portion, the second portion being larger than the first portion, wherein the container includes a container portion for containing a specimen and a cap portion, wherein the first portion of the recess or protrusion or combination generally conformally receives and secures the container portion of the container, wherein the second portion of the recess or protrusion or combination generally conformally receives and secures the cap portion of the container; and a lid having at least one feature preventing rotation of the rotor when the rotor is not currently rotating or retarding rotation of the rotor when the rotor is currently rotating, in response to the lid not being in a closed position, wherein the at least one feature is a protrusion extending inwardly from an inner surface of the lid, and wherein in response to the lid being in the closed position, the protrusion is positioned between a brake and the rotor, urging the brake away from a frictional contact with the rotor, and permitting the rotor to rotate.

9. A centrifuge, comprising:

a rotor having at least one recess, at least one protrusion or a combination of the at least one recess or the at least one protrusion defining a concave arrangement, each of the at least one recess, the at least one protrusion or the combination of the at least one recess or the at least one protrusion adapted to receive a corresponding specimen container, wherein the at least one recess or the at least one protrusion includes a first portion and a second portion, the second portion having a different size than the first portion, with a shoulder positioned between the first portion and the second portion; and a lid having at least one feature preventing rotation of the rotor when the rotor is not currently rotating or retarding rotation of the rotor when the rotor is currently rotating, in response to the lid not being in a closed position, wherein the at least one feature is a protrusion extending inwardly from an inner surface of the lid, and wherein in response to the lid being in the closed position, the protrusion is positioned between a brake and the rotor, urging the brake away from a frictional contact with the rotor, and permitting the rotor to rotate.

10. A centrifuge, comprising:

a rotor including a first surface and an opposed second surface, the first surface having at least one recess adapted to receive a corresponding specimen container, wherein the at least one recess having at least one aperture in fluid communication between the first surface and the second surface, wherein the at least one recess includes a first portion and a second portion, the second portion having a different size than the first portion, with a shoulder positioned between the first portion and the second portion; and a lid having at least one feature preventing rotation of the rotor when the rotor is not currently rotating or retarding rotation of the rotor when the rotor is currently rotating, in response to the lid not being in a closed position, wherein the at least one feature is a protrusion extending inwardly from an inner surface of the lid, and wherein in response to the lid being in the closed position, the protrusion is positioned between a brake and the rotor, urging the brake away from a frictional contact with the rotor, and permitting the rotor to rotate.

11. The centrifuge of claim 10, wherein in response to rotational movement of the rotor during operation of the centrifuge, a pressure in the at least one aperture is reduced, resulting in a retention force for retaining the corresponding specimen container in the at least one recess.

12. The centrifuge of claim 10, wherein a cross section of at least a portion of the at least one recess is different than another portion of the at least one recess.

13. The centrifuge of claim 10, wherein at least one interface between the first surface and the at least one recess and between the second surface and the at least one recess includes a discontinuous region.

14. The centrifuge of claim 10, wherein the second surface includes a surface feature associated with the at least one recess.

* * * * *